(12) United States Patent
Ahrens

(10) Patent No.: US 9,340,662 B2
(45) Date of Patent: May 17, 2016

(54) FATTY ACID CONDENSATION PRODUCTS AS DISPERSING AGENT IN PIGMENT PREPARATIONS

(71) Applicant: Hendrik Ahrens, Kriftel (DE)

(72) Inventor: Hendrik Ahrens, Kriftel (DE)

(73) Assignee: CLARIANT INTERNATIONAL LTD., Muttenz (CH)

( * ) Notice: Subject to any disclaimer, the term of this patent is extended or adjusted under 35 U.S.C. 154(b) by 0 days.

(21) Appl. No.: 14/409,187

(22) PCT Filed: May 10, 2013

(86) PCT No.: PCT/EP2013/001398
§ 371 (c)(1),
(2) Date: Dec. 18, 2014

(87) PCT Pub. No.: WO2014/000842
PCT Pub. Date: Jan. 3, 2014

(65) Prior Publication Data
US 2015/0175780 A1  Jun. 25, 2015

(30) Foreign Application Priority Data
Jun. 29, 2012  (DE) .................. 10 2012 013 046

(51) Int. Cl.
| | | |
|---|---|---|
| *C09D 11/03* | (2014.01) | |
| *C09D 11/033* | (2014.01) | |
| *C09B 67/00* | (2006.01) | |
| *C09D 4/00* | (2006.01) | |
| *C09D 5/00* | (2006.01) | |
| *C09D 17/00* | (2006.01) | |
| *C08K 13/02* | (2006.01) | |
| *C09B 67/20* | (2006.01) | |

(52) U.S. Cl.
CPC ............. *C08K 13/02* (2013.01); *C09B 67/0066* (2013.01); *C09D 17/00* (2013.01)

(58) Field of Classification Search
CPC .... C09D 11/03; C09D 11/033; C09D 17/001; C09D 17/003; C09D 17/004; C09D 17/007; C09D 17/008; C09D 5/00; C09D 4/00; C09B 67/0066
USPC ......... 106/31.75, 31.86, 31.67, 487, 499, 504
See application file for complete search history.

(56) References Cited

U.S. PATENT DOCUMENTS

| | | | |
|---|---|---|---|
| 3,840,383 A | 10/1974 | Bockmann et al. | |
| 4,156,616 A * | 5/1979 | Dietz ..................... | C09D 17/00 106/499 |
| 5,042,699 A | 8/1991 | Sindoni | |
| 5,618,336 A * | 4/1997 | Wagner .................. | B29C 33/62 106/2 |
| 5,911,342 A | 6/1999 | Sindoni | |
| 5,935,315 A * | 8/1999 | Bostrom ................ | C09D 17/00 106/499 |
| 5,950,874 A | 9/1999 | Sindoni | |
| 6,218,459 B1 | 4/2001 | Gruning et al. | |
| 6,269,978 B1 | 8/2001 | Sindoni | |
| 7,608,653 B2 * | 10/2009 | Wulff ................... | C09D 7/1233 106/287.23 |
| 8,968,462 B2 * | 3/2015 | Ahrens ................ | C09D 17/004 106/504 |
| 2010/0113685 A1 | 5/2010 | Coward et al. | |
| 2015/0247023 A1 * | 9/2015 | Ahrens ............... | C09B 67/0066 106/31.75 |
| 2015/0259503 A1 * | 9/2015 | Ahrens ................ | C09D 17/001 106/31.78 |
| 2015/0267038 A1 * | 9/2015 | Ahrens .................. | C09D 11/00 106/31.75 |

FOREIGN PATENT DOCUMENTS

| | | |
|---|---|---|
| DE | 2638946 | 3/1978 |
| DE | 3022613 A1 * | 1/1982 |
| DE | 19654829 | 6/1998 |
| DE | 19822603 | 11/1999 |
| DE | 69626405 | 1/2004 |
| DE | 10233081 | 2/2004 |
| DE | 102004034646 | 2/2006 |
| EP | 0659529 | 6/1995 |
| WO | WO 97/21775 | 6/1997 |
| WO | WO2011/151277 | 12/2011 |

OTHER PUBLICATIONS

International Search Report for PCT/EP2013/001398, dated Jul. 25, 2013.
International Preliminary Report on Patentability for PCT/EP2013/001398, dated Dec. 31, 2014.
English Abstract of DE10233081, Feb. 5, 2004.
English Abstract of DE19654829, Jun. 25, 1998.
English Abstract of EP0659529 Jun. 28, 1995.
"Cosmetic compositions comprising Polyquaternium-74 copolymer", ip.com Journal, ip.com Inc., West Henrietta, NY, US, Nov. 28, 2007, pp. 1-115.

* cited by examiner

*Primary Examiner* — Helene Klemanski
(74) *Attorney, Agent, or Firm* — Tod A. Waldrop

(57) ABSTRACT

The invention relates to aqueous pigment preparations containing (A) 1.0 to 75.0 percent by weight of at least one organic or inorganic white or colored pigment or a mixture of different inorganic white or colored pigments, (B) 0.01 to 8.0 percent by weight of at least one fatty acid condensation product with the formula (I), (C) 0.01 to 12.0 percent by weight of a nonionic surfactant and (G) water.

(I)

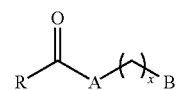

21 Claims, No Drawings

FATTY ACID CONDENSATION PRODUCTS AS DISPERSING AGENT IN PIGMENT PREPARATIONS

The present invention provides aqueous pigment dispersions which comprise fatty acid condensation products as dispersants, and also provides their use for coloring macromolecular materials of all kinds, such as fiber materials, paper stock dyeing, coating materials, varnishes, paints, for example, and the use thereof for printing two-dimensional sheetlike structures such as paper, cardboard packaging, plastic, textiles, and leather, for example.

For the coloring of macromolecular materials, particularly of paints and varnishes, aqueous pigment preparations are produced with organic or inorganic pigments. These pigment preparations are employed as tinting pastes in home stores and decorating shops, and are added by means of metering and tinting systems to aqueous and solvent-containing paints and varnishes to produce shades that are in line with customer requirements. DE-19654829 describes a metering and tinting system for producing colored media. U.S. Pat. No. 5,042,699, U.S. Pat. No. 5,911,342, U.S. Pat. No. 5,950,874, and U.S. Pat. No. 6,269,978 describe metering systems for coloring paints by means of volumetric metering devices. In homestores and decorating shops, tinting pastes are customarily metered into paints in 5 to 10 liter containers, and mixed in shaker machines. For the precise establishment of a particular shade, the tinting pastes are metered volumetrically. The smallest meterable unit is 0.1 ml. In the case of particularly strongly coloring pigments, therefore, the pigment concentration must not be too high, so that in the event of overmetering there is still no perceptible shade shift observable. Tinting pastes customarily comprise pigment concentrations within a broad concentration range of 1 to 75 mass %.

WO 2011151277 describes tinting pastes with a low VOC content, which in addition to nonvolatile organic solvents and stabilizers may comprise at least one colored pigment and optionally also rheological additives and fillers, the pigment concentration being situated in a range from 4 to 77 mass %.

DE-A-26 38 946 teaches pigment dispersions which are suitable for pigmenting both hydrophilic and hydrophobic media. In addition to the pigments, they comprise adducts of alkylene oxide onto long-chain, preferably primary, amines, and anionic surfactants having at least one aliphatic radical which contains 3 to 40, preferably 6 to 22, carbon atoms. The anionic surfactants may be added as salts or else in the form of the acids. Suitable in particular are monobasic anionic surfactants. Besides the stated constituents, the pigment dispersions may also comprise nonionic surfactants, and also preservatives, water and/or substances which prevent them drying out.

EP-A-0 866 838 teaches a pigment dispersion which is entirely free from organic solvents and comprises
a) 1.0 to 65 wt % of a coloring pigment,
b) 4 to 20 wt % of a water-soluble or water-dispersible amidoalkoxylate of the formula

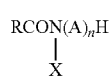

(I)

in which
R is an aliphatic hydrocarbon group having 7 to 22 carbon atoms, preferably 9 to 18 carbon atoms,
A independently at each occurrence is an alkyleneoxy group having 2 to 3 carbon atoms,
X is hydrogen or the group $(A)_nH$, in which A has the definition given above,
n is a number from 1 to 15, with the sum total of all ns being 3 to 20,
c) 15 to 86 wt % of water,
d) 0 to 20 wt % of a filler,
e) 0 to 5 wt % of an anionic and/or amphoteric surfactant,
f) 0 to 2 wt % of a water-retaining polymer.

DE-A-102 33 081 teaches the use of solid pigment preparations which comprise as essential constituents
(A) 60 to 90 wt % of at least one pigment and
(B) 10 to 40 wt % of at least one surface-active additive from the group of the nonionic polyethers and their acidic phosphoric, phosphonic, sulfuric and/or sulfonic esters and salts thereof
for coloring plastics.

DE-A-198 22 603 teaches aqueous pigment pastes comprising hydrophobically modified polyaspartic acid derivatives as dispersants. The invention relates in particular to the use of hydrophobically modified polyaspartic acid derivatives as dispersants for producing aqueous pigment pastes.

US-2010113685 describes universal pastes for the coloring of aqueous and solvent-containing paints and varnishes which have been stabilized by means of nonionic surfactants.

Although the prior art proposes a multiplicity of compounds as suitable wetting agents and dispersants, there is again and again in practice a lack of effective dispersants for pigment dispersions which satisfy the requirements of sedimentation stability, rheological behavior, color yield on the part of the pigments, and a low human-toxicology and ecotoxicology behavior.

Furthermore, awarding guidelines for environmental seals restrict the use of known wetting and dispersing assistants, and, accordingly, the skilled person is always looking for new dispersants and combinations in order to produce liquid, stable, aqueous pigment preparations.

The object of the present invention was to prepare stable and fluid aqueous pigment preparations which over a prolonged time period exhibit no sedimentation of the pigments used, and which can be used equally to color aqueous and solventborne paints, varnishes, and stains. In the tinting of aqueous varnishes and paints, more particularly emulsion paints, silicate emulsion paints, and aqueous silicone resin paints, the pigment preparations of the invention ought not to evince any rubout problems.

Furthermore, the aqueous pigment preparations are also to be compatible with solventborne varnishes, to be homogeneously dispersible in the varnish by mixing, stirring or shaking, and to produce a consistent, even paint outcome on brush or roller application to surfaces. Also serving for the compatibility of the aqueous pigment preparations is the rubout test, which is carried out in the manner described in U.S. Pat. No. 3,840,383.

Another object of the invention was to provide aqueous pigment preparations with little human-toxicological potential and little environmental hazard. It is desirable to produce aqueous pigment preparations which under European Regulation 2008-1272 EC are not liable to labeling. Volatile organic compounds with a boiling point of <250° C. (VOC contents) are not to be added explicitly to the aqueous pigment preparations, and are to be present only in small amounts in the form of unreacted raw materials from synthesis, or as side reaction products.

Surprisingly it has been found that pigment preparations which comprise fatty acid condensation products of the formula I in combination with nonionic surfactants achieve this object.

The invention accordingly provides aqueous pigment preparations comprising (A) 1.0 to 75.0 wt % of at least one organic or inorganic white or chromatic pigment, or a mixture of different organic and inorganic white or chromatic pigments, (B) 0.01 to 8.0 wt % of at least one fatty acid condensation product of the formula (I),

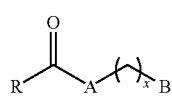

(I)

in which

R is a linear or branched alkyl or alkenyl radical having 7 to 21 carbon atoms,

A is an oxygen atom, a —NH group, a —N(CH$_3$) group, or a group of the formula (II),

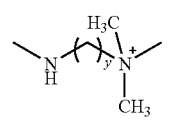

(II)

B is a carboxylic acid group of the formula —COOH, a sulfonic acid group of the formula —SO$_3$H, the sodium, potassium, ammonium or monoalkanolammonium or trialkanolammonium salts thereof, and the deprotonated form —COO$^-$ and —SO$_3^-$ thereof, and x and y independently of one another are an integer from 1 to 6, (C) 0.01 to 12.0 wt % of a nonionic surfactant, and (G) water.

The pigment preparation of the invention may further comprise one or more of the following constituents:

(D) 0-8.0% of clay mineral thickeners based on natural or alkali-activated montmorillonite phyllosilicate minerals, (E) 0-20.0% of inorganic fillers, and (F) optionally 0 to 30 wt % of further auxiliaries customary for the production of aqueous pigment preparations, such as additional wetting agents, humectants, solvents, defoamers, rheological additives, preservatives, buffer substances, and pH regulators.

The term "alkanol" in mono- and trialkanolammonium refers preferably to C$_2$ to C$_6$ alkanols.

The pigment preparations of the invention are stable to shearing, resistant to drying up, stable in storage, produce little or no foam during application, and possess an outstanding rheology.

Component (A) of the pigment preparations of the invention is preferably a finely divided, organic or inorganic, white or chromatic pigment or a mixture of different pigments.

An exemplary selection of particularly preferred organic pigments includes carbon black pigments, such as gas blacks or furnace blacks, for example; monoazo and disazo pigments, more particularly the Colour Index pigments Pigment Yellow 1, Pigment Yellow 3, Pigment Yellow 12, Pigment Yellow 13, Pigment Yellow 14, Pigment Yellow 16, Pigment Yellow 17, Pigment Yellow 73, Pigment Yellow 74, Pigment Yellow 81, Pigment Yellow 83, Pigment Yellow 87, Pigment Yellow 97, Pigment Yellow 111, Pigment Yellow 126, Pigment Yellow 127, Pigment Yellow 128, Pigment Yellow 155, Pigment Yellow 174, Pigment Yellow 176, Pigment Yellow 191, Pigment Yellow 213, Pigment Yellow 214, Pigment Red 38, Pigment Red 144, Pigment Red 214, Pigment Red 242, Pigment Red 262, Pigment Red 266, Pigment Red 269, Pigment Red 274, Pigment Orange 13, Pigment Orange 34, or Pigment Brown 41; β-naphthol and naphthol AS pigments, more particularly the Colour Index pigments Pigment Red 2, Pigment Red 3, Pigment Red 4, Pigment Red 5, Pigment Red 9, Pigment Red 12, Pigment Red 14, Pigment Red 53:1, Pigment Red 112, Pigment Red 146, Pigment Red 147, Pigment Red 170, Pigment Red 184, Pigment Red 187, Pigment Red 188, Pigment Red 210, Pigment Red 247, Pigment Red 253, Pigment Red 254, Pigment Red 256, Pigment Orange 5, Pigment Orange 38, or Pigment Brown 1; laked azo and metal complex pigments, more particularly the Colour Index pigments Pigment Red 48:2, Pigment Red 48:3, Pigment Red 48:4, Pigment Red 57:1, Pigment Red 257, Pigment Orange 68, or Pigment Orange 70; benzimidazoline pigments, more particularly the Colour Index pigments Pigment Yellow 120, Pigment Yellow 151, Pigment Yellow 154, Pigment Yellow 175, Pigment Yellow 180, Pigment Yellow 181, Pigment Yellow 194, Pigment Red 175, Pigment Red 176, Pigment Red 185, Pigment Red 208, Pigment Violet 32, Pigment Orange 36, Pigment Orange 62, Pigment Orange 72, or Pigment Brown 25; isoindolinone and isoindoline pigments, more particularly the Colour Index pigments Pigment Yellow 139 or Pigment Yellow 173; phthalocyanine pigments, more particularly the Colour Index pigments Pigment Blue 15, Pigment Blue 15:1, Pigment Blue 15:2, Pigment Blue 15:3, Pigment Blue 15:4, Pigment Blue 15:6, Pigment Blue 16, Pigment Green 7, or Pigment Green 36; anthanthrone, anthraquinone, quinacridone, dioxazine, indanthrone, perylene, perinone, and thioindigo pigments, more particularly the Colour Index pigments Pigment Yellow 196, Pigment Red 122, Pigment Red 149, Pigment Red 168, Pigment Red 177, Pigment Red 179, Pigment Red 181, Pigment Red 207, Pigment Red 209, Pigment Red 263, Pigment Blue 60, Pigment Violet 19, Pigment Violet 23, or Pigment Orange 43; and triarylcarbonium pigments, more particularly the Colour Index pigments Pigment Red 169, Pigment Blue 56, or Pigment Blue 61.

Examples of suitable inorganic pigments are titanium dioxides, zinc sulfides, zinc oxides, iron oxides, magnetites, manganese iron oxides, chromium oxides, ultramarine, nickel or chromium antimony titanium oxides, manganese titanium rutiles, cobalt oxides, mixed oxides of cobalt and aluminum, rutile mixed phase pigments, rare earth sulfides, spinels of cobalt with nickel and zinc, spinels based on iron and chromium with copper, zinc, and manganese, bismuth vanadates, and extender pigments. Used more particularly are the Colour Index pigments Pigment Yellow 184, Pigment Yellow 53, Pigment Yellow 42, Pigment Yellow Brown 24, Pigment Red 101, Pigment Blue 28, Pigment Blue 36, Pigment Green 50, Pigment Green 17, Pigment Black 11, Pigment Black 33, and Pigment White 6. Preference is also frequently given to using mixtures of inorganic pigments. Mixtures of organic with inorganic pigments are likewise frequently used.

Component (B) of the pigment preparations of the invention is a fatty acid condensation product based on natural or synthetic fatty acids. The fatty acids used as raw material may be saturated or unsaturated. Suitable fatty acids are capric acid, lauric acid, myristic acid, palmitic acids, margaric acid, stearic acid, arachidic acid, behenic acid, palmitoleic acid, oleic acid, and naturally occurring mixtures such as palm kernel oil fatty acid, rapeseed oil fatty acid, sunflower oil fatty acid, soya oil fatty acid, or resin acids such as tall oil fatty acid. Suitable fatty acid condensation products are fatty acid isethionates, as for example coconut fatty acid isethionate as sodium, potassium, or ammonium salts (formula III),

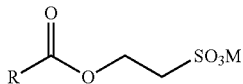

(III)

fatty acid taurides as sodium, potassium, or ammonium salts, fatty acid methyltaurides such as, for example, coconut fatty acid methyltauride and oleic acid methyltauride, as sodium, potassium, and ammonium salts (formula IV),

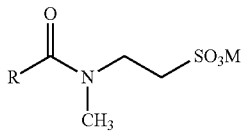

(IV)

fatty acid glycinates, such as, for example, cocoyl glycinate, as sodium, potassium, and ammonium salts (formula V),

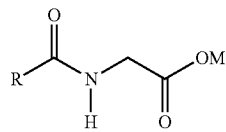

(V)

fatty acid amidocarboxylic acid in acid form and as sodium, potassium, ammonium, monoalkanolammonium, and trialkanolammonium salt (formula VI), such as, for example, the ε-isononamidocaproic acid and its triethanolammonium salt,

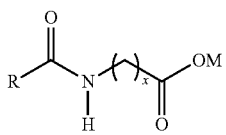

(VI)

sarcosines such as oleylsarcosine and sarcosides, such as, for example, lauroylsarcoside as sodium, potassium, and ammonium salts (formula VII), and

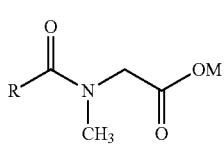

(VII)

betaines, such as, for example, coconut fatty acid amidopropyl betaine (formula VIII).

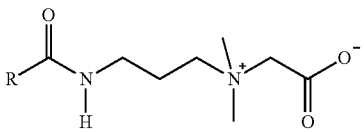

(VIII)

In the formulae (III) to (VII), M is sodium, potassium, ammonium, monoalkanolammonium, or trialkanolammonium.

Component (C) of the pigment preparations of the invention is a nonionic surfactant. It is preferably selected from the group consisting of fatty alcohol ethoxylates, di- and tristyrylphenol ethoxylates, di- and tributylphenol ethoxylates, fatty acid ethoxylates, esters of polyethylene glycols with fatty acids, fatty acid alkanolamide ethoxylates, EO/PO block copolymers, fatty alcohol-EO/PO adducts, and also end group-capped fatty alcohol ethoxylates. Mixed alkoxylates may be both randomly alkoxylated and alkoxylated in blocks, unless otherwise described below.

Alcohols suitable for preparing the fatty alcohol ethoxylates are fatty alcohols having 8 to 22 carbon atoms and of natural origin such as octyl alcohol, decyl alcohol, lauryl alcohol, myristyl alcohol, cetyl alcohol, palmitinol, stearyl alcohol, eicosanol, behenyl alcohol, oleyl alcohol, linolyl alcohol, linolenol, ricinol alcohol, or mixtures of $C_8$ to $C_{22}$ chain fractions, such as, for example, coconut fatty alcohol and palm kernel oil alcohol. Also suitable are synthetic primary alcohols such as iso-$C_{13}$ oxo-process alcohols, $C_{13}/C_{15}$ oxo-process alcohols, mixtures of linear, singly branched or multiply branched oxo-process alcohols having an average C chain length of 10 to 15 carbon atoms, Ziegler alcohols with 8 to 22 carbon atoms and Guerbet alcohols with 10, 12, 14, 16, or 18 carbon atoms, and linear and branched, secondary alkanols having 6 to 22 carbon atoms. The alcohols used may be in saturated and unsaturated forms. The fatty alcohols are reacted in a manner known per se, with aid from alkaline or acidic catalysts, with ethylene oxide. The average degree of ethoxylation of the alcohols is 1 to 100 mol of ethylene oxide, preferably 3 to 50, and more preferably 5 to 30 mol of ethylene oxide.

In a similar way, di- and tristyrylphenol ethoxylates (formula (IX)) and di- and tributylphenol ethoxylates (formula (X)) are also prepared from di- and tristyrylphenol and from di- and tributylphenol, respectively, it being possible for the alcohols to be present as mixtures of mono-, di-, and tristyrylphenol or mono-, di-, and tributylphenol, respectively, and for the average degree of substitution to be from 2 to 3 1-phenylethyl units or 2 to 3 tert-butyl units, respectively:

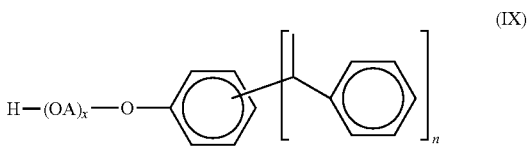

(IX)

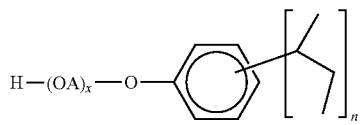
(X)

where x=1-100, A=ethylene group, and n=2 or 3.

Suitable fatty acid ethoxylates are reaction products of ethylene oxide with fatty acids, such as the natural and synthetic fatty acids described and used for component (B) of the pigment preparations of the invention, which have been reacted with 1 to 100 mol of ethylene oxide, preferably 3 to 50, and more preferably 5 to 30 mol of ethylene oxide.

Further fatty acid derivatives suitable for the reaction with ethylene oxide are fatty acid sorbitan esters, castor oil, fatty acid glycerol esters, and fatty acid polyglycerol esters.

Further suitable nonionic surfactants are esterification products of polyethylene glycol having an average molecular weight of 200 to 8000 g/mol with fatty acids, like natural and synthetic fatty acids described and used for component (B) of the pigment preparations of the invention.

One particularly preferred group of nonionic surfactants for component (C) are ethoxylation products of fatty acid alkanolamides. Particularly preferred are ethoxylated fatty acid ethanolamides (formula (XI)).

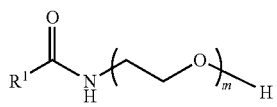
(XI)

Ethoxylated fatty acid ethanolamides are prepared preferably by reaction of fatty acids with ethanolamine to give the fatty acid ethanolamide, with a subsequent addition reaction of ethylene oxide by means of alkaline catalysts such as sodium or potassium methoxide. $R^1$ is preferably an alkyl or alkenyl group having 11 to 19 carbon atoms, and there may also be more than one double bond present. Preferably m is at least 2, more particularly at least 3. Starting from the fatty acid ethanolamide, ethylene oxide is added on preferably to the terminal hydroxyl group. The addition of ethylene oxide to the nitrogen of the acid amide group takes place to a minor extent in a secondary reaction, and so to a minor extent there are also 2 polyethylene glycol ether radicals bonded on the nitrogen. Suitable fatty acids for preparing the fatty acid ethanolamides are capric acid, lauric acid, myristic acid, palmitic acids, margaric acid, stearic acid, arachidic acid, behenic acid, palmitoleic acid, oleic acid, and naturally occurring mixtures such as palm kernel oil fatty acid, rapeseed oil fatty acid, sunflower oil fatty acid, soya oil fatty acid, or resin acids such as tall oil fatty acid. The fatty acids used as raw material may be in saturated and unsaturated forms.

Further nonionic surfactants suitable as component (C) are ethylene oxide/propylene oxide block copolymers having an average molecular weight of preferably 1000 to 10 000 g/mol and an ethylene oxide content of preferably 10 to 99 wt % in the molecule. The ethylene oxide/propylene oxide block copolymers are prepared by addition reaction of ethylene oxide onto polypropylene glycol (formula (XII)) or by addition reaction of propylene oxide onto polyethylene glycol (formula (XIII)). They correspond in one embodiment to the formulae XII and XIII.

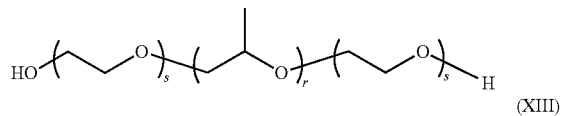
(XII)

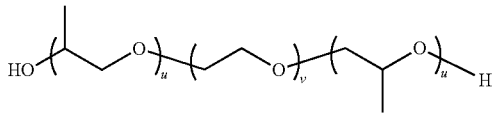
(XIII)

In the formulae XII and XIII, s, r, u, and v, independently of one another, are integers from 3 to 100.

Further nonionic surfactants suitable as component (C) are fatty alcohol EO/PO adducts and end group-capped fatty alcohol ethoxylates. Suitable fatty alcohol EO/PO adducts are prepared by blockwise addition of ethylene oxide and propylene oxide onto fatty alcohols. The fatty alcohols are either reacted first with ethylene oxide and subsequently with propylene oxide (formula (XIV)) or, in the reverse order, addition takes place first with propylene oxide and subsequently with ethylene oxide (formula (XV)).

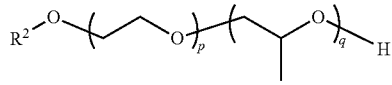
(XIV)

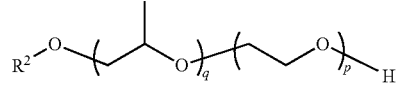
(XV)

$R^2$ is the alkyl radical of a fatty alcohol as already described in the context of the use of fatty alcohol ethoxylates. p and q are integers from 1 to 100, preferably from 3 to 50, and more preferably from 5 to 30.

Suitable end group-capped fatty alcohol ethoxylates (formula (XVI)) are reaction products of fatty alcohol ethoxylates with alkyl halides, as for example methyl chloride, ethyl chloride, and n-butyl chloride.

(XVI)

$R^2$ is the alkyl radical of a fatty alcohol as already described for the preparation of fatty alcohol ethoxylates. p is an integer from 1 to 100, preferably from 3 to 50, and more preferably from 5 to 30, and $R^3$ is a methyl, ethyl, or n-butyl radical.

Component (D) is a clay mineral thickener based on natural or alkali-activated montmorillonite phyllosilicate minerals. Montmorillonite is the main constituent of bentonite and possesses a high ion exchange capacity. When water is added, the mineral expands by a multiple of the original size, thereby raising the viscosity of the aqueous dispersion. Montmorillonite as clay mineral thickener can be added to the pigment preparation of the invention in order to retard or prevent the settling of organic and inorganic pigments and fillers and the syneresis—that is, the formation of a second phase with a different composition.

Component (E) is an inorganic filler, which may be added to the pigment preparations of the invention in order to raise the density and modify the flow behavior. In the case of volumetric metering and low pigment concentration or lightweight organic pigments, it may be possible that the pigment preparation is difficult to feed into the metering equipment, since the gravitational force is not sufficient to empty the liquid pigment preparation into the paint can. In other cases, at low pigment concentrations, the viscosity of the pigment preparations is too low, leading to dripping. In both cases, colorless inorganic fillers may be added to the pigment preparations of the invention, in order to raise the density of the pigment preparation and to improve the flow behavior. Suitable fillers are calcium carbonates such as naturally occurring chalk and precipitated calcium carbonate, dolomite, natural silicon dioxide (finely ground quartz), fumed and precipitated silicas, kieselguhr, aluminum oxides, aluminum hydroxides, talc, kaolin, mica (potassium aluminum silicate hydrate), barium sulfates such as naturally occurring heavy spars, and precipitated blanc fixe.

Components (F) are further auxiliaries customary for the production of aqueous pigment preparations, such as additional wetting agents, humectants, solvents, defoamers, rheological additives, preservatives, buffer substances, and pH regulators.

Additional wetting agents may be wetting agents based on polysiloxane ethers, as for example a methoxypolyethoxypropyltrisiloxane, alkynediol ethoxylates, and fluorosurfactants.

Suitable humectants and solvents are preferably glycol ethers, by which are meant here compounds having ethoxy and/or propoxy groups and having average molar masses of between 200 and 20 000 g/mol, more particularly polyethylene glycol ethers or polypropylene glycol ethers having an average molar mass of between 200 and 20 000 g/mol, mono-, di-, or triethylene glycol, mono-, di-, or tripropylene glycol, methyl-, ethyl-, propyl-, butyl-, or higher alkyl-polyalkylene glycol ethers having 1, 2, 3, or more ethylene glycol or propylene glycol units such as, for example, methoxypropanol, dipropylene glycol monomethyl ether, tripropylene glycol monomethyl ether, ethylene glycol monobutyl ether, diethylene glycol monobutyl ether, butylpolyethylene glycol ether, propylpolyethylene glycol ether, ethylpolyethylene glycol ether, methylpolyethylene glycol ether, dimethylpolyethylene glycol ether, dimethylpolypropylene glycol ether, and glycerol ethoxylates having a molecular weight of 200 to 20 000 g/mol, pentaerythritol alkoxylates having a molecular weight of 200 to 20 000 g/mol, or further ethoxylation and alkoxylation products, and random or block copolymers prepared by addition of ethylene oxide and/or propylene oxides onto monohydric and higher polyhydric alcohols, with a molecular weight of 200 to 20 000 g/mol.

Figures for molecular weights of polymers are always based on their number-average molecular weight, unless indicated otherwise in any particular case. Molecular weights can be determined by GPC against polyethylene glycol as standard.

Further suitable auxiliaries in the aqueous pigment preparations of the invention are preferably water-soluble organic or hydrotropic substances, which optionally also serve as solvents. Particularly suitable, for example, are formamide, urea, tetramethylurea, ε-caprolactam, glycerol, diglycerol, polyglycerol, N-methylpyrrolidone, 1,3-diethyl-2-imidazolidinone, thiodiglycol, sodium benzenesulfonate, sodium xylenesulfonate, sodium-toluenesulfonate, sodium cumenesulfonate, sodium dodecylsulfonate, sodium benzoate, sodium salicylate, sodium butyl monoglycol sulfate.

Suitable defoamers are preferably mineral oil defoamers and emulsions thereof, silicone oil defoamers and silicone oil emulsions, polyalkylene glycols, polyalkylene glycol fatty acid esters, fatty acids, higher alcohols, phosphoric esters, hydrophobically modified silica, aluminum tristearate, polyethylene waxes, and amide waxes.

Suitable further rheological additives as agents for regulating the viscosity are, for example, starch derivatives and cellulose derivatives, and hydrophobically modified ethoxylated urethanes (HEUR) thickeners, alkali-swellable acrylate thickeners, hydrophobically modified acrylate thickeners, polymers of acrylamidomethylpropanesulfonic acid, or fumed silica.

In-can preservatives are added to stabilize the aqueous pigment preparations and to prevent the uncontrolled multiplication of bacteria, algae, and fungi. Suitable biocides are formaldehyde, formaldehyde donor components, methylisothiazolinone, chloromethylisothiazolinone, benzisothiazolinone, bronopol, dibromodicyanobutane, and silver chloride-coated titanium dioxide.

Buffer substances and pH regulators employed are preferably organic or inorganic bases and acids. Preferred organic bases are amines, such as ethanolamine, diethanolamine, triethanolamine, N,N-dimethylethanolamine, diisopropylamine, 2-amino-2-methyl-1-propanol, or dimethylaminomethylpropanol, for example. Preferred inorganic bases are sodium hydroxide, potassium hydroxide, and lithium hydroxide, or ammonia.

Water used in preparing the aqueous pigment preparations of the invention, component (G), is employed preferably in the form of distilled or demineralized water. Drinking water (mains water) as well, and/or water of natural origin, may be used. Water is present in the aqueous pigment preparation of the invention at preferably 10 to 75 wt %, more particularly ad 100 wt %.

The aqueous pigment preparations of the invention preferably have a viscosity of 10 to 10 000 mPas, more preferably 30 to 5000 mPas, and very preferably 50 to 3000 mPas, measured with a cone/plate viscometer at a shear rate of $1/60$ sec$^{-1}$, e.g., with a Haake viscometer 550.

The aqueous pigment preparations of the invention are miscible with water in any proportion, and a plurality of different preparations can also be mixed with water. The preparations are notable, relative to conventional pigment preparations, for outstanding stability in storage, and good rheological properties.

The present invention also provides a method for producing the pigment preparations of the invention, by dispersing component (A) in the form of powder or granules in the presence of water (G) and also of components (B), (C), and optionally (D), (E), and (F) in an intrinsically conventional way, then optionally admixing further water (G), and adjusting the resultant aqueous pigment dispersion with water to the desired concentration. The components (B), (C), (G), and optionally (D), (E), and (F) are preferably mixed and homogenized, then the component (A) is stirred into the mixture introduced initially, with the pigment being pasted and subjected to preliminary dispersing. Depending on the grain harshness of the pigments used, this is followed by fine dispersion or fine distribution with the aid of a milling or dispersing assembly, optionally with cooling. For this purpose, use may be made of stirring mechanisms, dissolvers (sawtooth stirrers), rotor-stator mills, ball mills, agitated ball mills such as sand mills and bead mills, high-speed mixers, kneading apparatus, roll mills, or high-performance bead mills. The fine dispersing and/or milling of the pigments takes place until the desired particle size distribution is reached, and may be carried out at temperatures in the range from 0 to 100° C., usefully at a temperature between 10 and 70° C., preferably at 20 to 60° C. After fine dispersing has taken place, the pigment preparation may be diluted further with water, preferably deionized or distilled water.

The pigment preparations of the invention are suitable for pigmenting and coloring macromolecular materials of all kinds. In particular the pigment preparations of the invention are suitable for pigmenting and producing emulsion and other paints, dispersion-based varnishes, printing inks, including for example textile, flexographic, decorative or gravure printing inks, wallpaper inks, water-thinnable varnishes, wood stains, wood preservative systems, and coatings for the surface coating of articles made, for example, of metal, wood, plastic, glass, ceramic, concrete, textile material, paper, or rubber.

Preferred components (B) and (C), and mixtures thereof, are those which do not have a caustic effect or irritate the skin or mucous membranes. A large number of anionic and non-ionic surfactants, however, cause severe eye damage. European Regulation 2008-1272 EC on the Classification, Labeling and Packaging of substances and mixtures prescribes according to its present status, within the European Community, from 2015 onward, that mixtures which comprise >1% of a caustic or >3% of an irritant surfactant will be classed as hazardous substances. It is therefore advantageous to use surfactants which exhibit little or no irritant effect on skin and mucous membranes.

Examples of mild anionic surfactants are coconut fatty acid methyltauride sodium salt, oleic acid methyltauride sodium salt, and isononamidocaproic acid triethanolammonium salt.

Examples of nonionic surfactants without labeling obligation are fatty alcohol ethoxylates having more than 20 mol of ethylene oxide, fatty acid ethoxylates, fatty acid ethanolamide ethoxylates, fatty alcohol EO/PO adducts, and EO/PO block polymers.

Particularly preferred are the combinations of
coconut fatty acid methyltauride sodium salt (component B) together with fatty acid ethanolamide ethoxylates (component C),
sodium cocoylglycinate (component B) together with fatty acid ethanolamide ethoxylates (component C), and
fatty acid amidocarboxylic acid in the form of triethanolammonium salt (component B) together with fatty acid ethanolamide ethoxylates (component C).

A particular feature of the pigment preparations of the invention is their use as universal tinting pastes. Universal tinting pastes are suitable not only for coloring aqueous paints but also for tinting solventborne varnishes. Customary dispersants for aqueous pigment preparations stabilize the pigments only in aqueous systems, but not in solventborne systems. If aqueous pigment preparations are used for coloring solventborne varnishes, there may be agglomeration of the pigments and there may be floating of the agglomerated pigments in the varnish. On application of the varnishes by brush, roller, or by spray application, streakiness may be a result, as may also be a rough paint outcome as a result of differences in shade, because the pigments undergo flocculation in the paint and during the drying process, and so the color strength is reduced. When the colored varnishes are applied, the pigment agglomerates are separated again, but to different extents, and hence the shade differences observed come about. In the laboratory, this phenomenon is simulated in the rubout test, which is described in U.S. Pat. No. 3,840,383.

EXAMPLES

Production of Pigment Preparation

The pigment, in the form alternatively of powder, granules, or presscake, is pasted in deionized water, together with the dispersants and the other additions, and then homogenized and subjected to preliminary dispersion, using a dissolver (e.g., from VMA-Getzmann GmbH, model AE3-M1) or other suitable apparatus. The subsequent fine dispersing takes place by means of a bead mill (e.g., the AE3-M1 from VMA-Getzmann) or else of another suitable dispersing assembly, with grinding taking place using siliquarzite beads or zirconium mixed oxide beads with a size of d=1 mm, accompanied by cooling, until the desired color strength and coloristic properties are obtained. The final pigment concentration desired is then set using deionized water, and the grinding media are separated off, and the pigment preparation is isolated.

Testing of Varnish Compatibility and Color Strength

In the tinting of aqueous and solventborne varnishes and paints, the pigment preparations of the invention largely exhibit good compatibility and no rubout. For the determination of the color strength and the compatibility, the pigment preparations are added to a mineral oil-containing long-oil alkyd varnish. For the testing of the color strength and compatibility, 200 g of tinted long-oil alkyd varnish, consisting of 92 wt % of base varnish and 8 wt % of the pigment preparation, are introduced into a metal can and homogenized for 60 seconds in an Inkshaker 500 from Olbrich Know-how, Hemer. After one day, the long-oil alkyd varnish is coated out onto a test card, using a 120 μm doctor blade on a film-drawing apparatus, model 509 MC, from Erichsen GmbH, Hemer. After 3 minutes, the rubout test is performed on the drying paint film in the manner described in the specification U.S. Pat. No. 3,840,383. The colorimetric values of the fully dried film are determined after 24 hours, using a Konica-Minolta CM 3600 model spectrophotometer.

The pigment preparations described in the examples below were produced by the method described above, the following constituents being used in the stated amounts in such a way as to give 100 parts of each pigment preparation. In the present specification, "parts" means parts by weight and percentages are weight percentages, unless indicated otherwise in any specific case.

Example 1

| | | |
|---|---|---|
| 50.0 | parts | C.I. Pigment Black 11 (Bayferrox ® Black 316, Lanxess, component (A)), |
| 2.9 | parts | 85% powder of a coconut fatty acid isethionate, sodium salt (Hostapon ® SCI-85 C, Clariant, component (B)), |
| 8.0 | parts | tall oil fatty acid ethanolamide reacted with 10 mol of ethylene oxide (component (C)), |
| 10.0 | parts | glycerol ethoxylate with a molecular weight of 300 g/mol (Polyglykol G 300, Clariant, component (F)), |
| 0.3 | parts | defoamer (D-Foam-R C 740, Clariant, component (F)), |
| 0.2 | parts | preservative (Nipacide ® BSM, Clariant, component (F)), |
| 28.6 | parts | water (component (G)) |

Components (B), (C), (D), and (E) are charged to a grinding vessel and mixed. The pulverulent component (A) is then added, and preliminary dispersion is carried out using the dissolver. Fine dispersion takes place in a bead mill with cooling, using zirconium mixed oxide beads with a size of d=1 mm. The grinding media are then separated off and the pigment preparation is isolated. The pigment preparation is stored at 60° C. for a week and inspected. The viscosity of the pigment preparation is measured using a Haake viscometer 550 at a shear rate of ⅟₆₀ sec⁻¹.

After storage for one week at 60° C., the pigment preparation is liquid, homogeneous, and foam-free. The viscosity of the pigment preparation is 246 mPa·s. The rubout test shows no change in shade. The color strength of the tinted long-oil alkyd varnish is set as the standard, at 100%, and is used as a value for comparison for the following examples.

Example 2

Comparative Example

| | | |
|---|---|---|
| 50.0 | parts | C.I. Pigment Black 11 (Bayferrox ® Black 316, Lanxess, component (A)), |
| 8.0 | parts | tall oil fatty acid ethanolamide reacted with 5 mol of ethylene oxide (component (C)), |
| 5.0 | parts | 50% aqueous solution of a sodium di-2-ethylhexylsulfosuccinate (Emulsogen ® SF8, Clariant, component (C)), |
| 10.0 | parts | glycerol ethoxylate with a molecular weight of 300 g/mol (Polyglykol G 300, Clariant, component (F)), |
| 0.3 | parts | defoamer (D-Foam-R C 740, Clariant, component (F)), |
| 0.2 | parts | preservative (Nipacide ® BSM, Clariant, component (F)), |
| 26.5 | parts | water (component (G)) |

For the production and testing of the pigment preparation, the procedure is as set out in example 1. After grinding, the pigment preparation is a liquid, viscous pigment dispersion. After storage for one week at 60° C., the pigment preparation is viscous and slightly foamy. The viscosity of the pigment preparation is 1232 mPa·s. The rubout test shows a change in shade. The color strength of the tinted long-oil alkyd varnish is 87%.

Example 3

Comparative Example

| | | |
|---|---|---|
| 50.0 | parts | C.I. Pigment Black 11 (Bayferrox ® Black 316, Lanxess, component (A)), |
| 8.0 | parts | tall oil fatty acid ethanolamide reacted with 5 mol of ethylene oxide (component (C)), |
| 2.5 | parts | oleic acid (Edenol Ti05, Oleon, component (C)), |
| 10.0 | parts | glycerol ethoxylate with a molecular weight of 300 g/mol (Polyglykol G 300, Clariant, component (F)), |
| 0.3 | parts | defoamer (D-Foam-R C 740, Clariant, component (F)), |
| 0.2 | parts | preservative (Nipacide ® BSM, Clariant, component (F)), |
| 29.0 | parts | water (component (G)) |

For the production and testing of the pigment preparation, the procedure is as set out in example 1. After grinding, the pigment preparation is a liquid, lightly foaming pigment dispersion. After storage for one week at 60° C., the pigment preparation is viscous and slightly foamy. The viscosity of the pigment preparation is 1360 mPa·s. The rubout test shows a slight change in shade. The color strength of the tinted long-oil alkyd varnish is 97%.

Example 4

| | | |
|---|---|---|
| 50.0 | parts | C.I. Pigment Black 11 (Bayferrox ® Black 316, Lanxess, component (A)), |
| 8.3 | parts | 30% aqueous, pasty dispersion of a coconut fatty acid methyltauride, sodium salt (Hostapon ® CT Paste, Clariant, component (B)), |
| 8.0 | parts | tall oil fatty acid ethanolamide reacted with 15 mol of ethylene oxide (component (C)), |
| 10.0 | parts | glycerol ethoxylate with a molecular weight of 300 g/mol (Polyglykol 300 g/mol (Polyglykol G 300, Clariant, component (F)), |
| 0.3 | parts | defoamer (D-Foam-R C 740, Clariant, component (F)), |
| 0.2 | parts | preservative (Nipacide ® BSM, Clariant, component (F)), |
| 23.2 | parts | water (component (G)) |

For the production and testing of the pigment preparation, the procedure is as set out in example 1. After storage for one week at 60° C., the pigment preparation is liquid, homogeneous, and foam-free. The viscosity of the pigment preparation is 264 mPa·s. The rubout test shows no change in shade. The color strength of the tinted long-oil alkyd varnish is 108%.

Example 5

| | | |
|---|---|---|
| 50.0 | parts | C.I. Pigment Black 11 (Bayferrox ® Black 316, Lanxess, component (A)), |
| 8.3 | parts | 30% aqueous solution of a sodium cocoyl glycinate (Hostapon ® SG, Clariant, component (B)), |
| 8.0 | parts | tall oil fatty acid ethanolamide reacted with 30 mol of ethylene oxide (component (C)), |
| 10.0 | parts | glycerol ethoxylate with a molecular weight of 300 g/mol (Polyglykol G 300, Clariant, component (F)), |
| 0.3 | parts | defoamer (D-Foam-R C 740, Clariant, component (F)), |
| 0.2 | parts | preservative (Nipacide ® BSM, Clariant, component (F)), |
| 23.2 | parts | water (component (G)) |

For the production and testing of the pigment preparation, the procedure is as set out in example 1. After storage for one week at 60° C., the pigment preparation is liquid, homogeneous, and foam-free. The viscosity of the pigment preparation is 320 mPa·s. The rubout test shows no change in shade. The color strength of the tinted long-oil alkyd varnish is 106%.

Example 6

| | | |
|---|---|---|
| 50.0 | parts | C.I. Pigment Black 11 (Bayferrox ® Black 316, Lanxess, component (A)), |
| 2.9 | parts | ε-isononanoylcaproic acid, triethanolammonium salt (Hostacor ® IT, Clariant, component (B)), |
| 8.0 | parts | tall oil fatty acid ethanolamide reacted with 15 mol of ethylene oxide (component (C)), |
| 10.0 | parts | glycerol ethoxylate with a molecular weight of 300 g/mol (Polyglykol G 300, Clariant, component (F)), |
| 0.3 | parts | defoamer (D-Foam-R C 740, Clariant, component (F)), |
| 0.2 | parts | preservative (Nipacide ® BSM, Clariant, component (F)), |
| 28.6 | parts | water (component (G)) |

For the production and testing of the pigment preparation, the procedure is as set out in example 1. After storage for one week at 60° C., the pigment preparation is liquid, homogeneous, and foam-free. The viscosity of the pigment preparation is 203 mPa·s. The rubout test shows no change in shade. The color strength of the tinted long-oil alkyd varnish is 99%.

Example 7

| | | |
|---|---|---|
| 50.0 | parts | C.I. Pigment Black 11 (Bayferrox ® Black 316, Lanxess, component (A)), |
| 8.3 | parts | 30% aqueous solution of a sodium lauroyl sarcoside (Medialan ® LD, Clariant, component (B)), |
| 8.0 | parts | tall oil fatty acid ethanolamide reacted with 30 mol of ethylene oxide (component (C)), |
| 10.0 | parts | glycerol ethoxylate with a molecular weight of 300 g/mol (Polyglykol G 300, Clariant, component (F)), |
| 0.3 | parts | defoamer (D-Foam-R C 740, Clariant, component (F)), |
| 0.2 | parts | preservative (Nipacide ® BSM, Clariant, component (F)), |
| 23.2 | parts | water (component (G)) |

For the production and testing of the pigment preparation, the procedure is as set out in example 1. After storage for one week at 60° C., the pigment preparation is liquid, homogeneous, and foam-free. The viscosity of the pigment preparation is 400 mPa·s. The rubout test shows no change in shade. The color strength of the tinted long-oil alkyd varnish is 112%.

Example 8

| | | |
|---|---|---|
| 50.0 | parts | C.I. Pigment Black 11 (Bayferrox ® Black 316, Lanxess, component (A)), |
| 8.3 | parts | 30% aqueous solution of a cocoamidopropyl betaine (Genagen ® CAB 818, Clariant, component (B)), |
| 8.0 | parts | tall oil fatty acid ethanolamide reacted with 15 mol of ethylene oxide (component (C)), |
| 10.0 | parts | glycerol ethoxylate with a molecular weight of 300 g/mol (Polyglykol G 300, Clariant, component (F)), |
| 0.3 | parts | defoamer (D-Foam-R C 740, Clariant, component (F)), |
| 0.2 | parts | preservative (Nipacide ® BSM, Clariant, component (F)), |
| 23.2 | parts | water (component (G)) |

For the production and testing of the pigment preparation, the procedure is as set out in example 1. After storage for one week at 60° C., the pigment preparation is liquid, homogeneous, and foam-free. The viscosity of the pigment preparation is 333 mPa·s. The rubout test shows no change in shade. The color strength of the tinted long-oil alkyd varnish is 100%.

Example 9

| | | |
|---|---|---|
| 60.0 | parts | C.I. Pigment Red 101 (Bayferrox ® Red 130, Lanxess, component (A)), |
| 8.3 | parts | 30% aqueous solution of a cocoamidopropyl betaine (Genagen ® CAB 818, Clariant, component (B)), |
| 8.0 | parts | tall oil fatty acid ethanolamide reacted with 15 mol of ethylene oxide (component (C)), |
| 10.0 | parts | glycerol ethoxylate with a molecular weight of 300 g/mol (Polyglykol G 300, Clariant, component (F)), |
| 0.3 | parts | defoamer (D-Foam-R C 740, Clariant, component (F)), |
| 0.2 | parts | preservative (Nipacide ® BSM, Clariant, component (F)), |
| 13.2 | parts | water (component (G)) |

For the production and testing of the pigment preparation, the procedure is as set out in example 1. After storage for one week at 60° C., the pigment preparation is liquid, homogeneous, and foam-free. The viscosity of the pigment preparation is 100 mPa·s. The rubout test shows no change in shade.

Example 10

| | | |
|---|---|---|
| 60.0 | parts | C.I. Pigment Yellow 42 (Bayferrox ® Yellow 3920, Lanxess, component (A)), |
| 8.3 | parts | 30% aqueous solution of a sodium cocoylglycinate (Hostapon ® SG, Clariant, component (B)), |
| 8.0 | parts | tall oil fatty acid ethanolamide reacted with 15 mol of ethylene oxide (component (C)), |
| 10.0 | parts | glycerol ethoxylate with a molecular weight of 300 g/mol (Polyglykol G 300, Clariant, component (F)), |
| 0.3 | parts | defoamer (D-Foam-R C 740, Clariant, component (F)), |
| 0.2 | parts | preservative (Nipacide ® BSM, Clariant, component (F)), |
| 13.2 | parts | water (component (G)) |

For the production and testing of the pigment preparation, the procedure is as set out in example 1. After storage for one week at 60° C., the pigment preparation is liquid, homogeneous, and foam-free. The viscosity of the pigment preparation is 1206 mPa·s. The rubout test shows no change in shade.

Example 11

| | | |
|---|---|---|
| 60.0 | parts | C.I. Pigment Green 17 (Chrome Oxide Green GN, Lanxess, component (A)), |
| 8.3 | parts | 30% aqueous solution of a sodium cocoylglycinate (Hostapon ® SG, Clariant, component (B)), |
| 8.0 | parts | tall oil fatty acid ethanolamide reacted with 15 mol of ethylene oxide (component (C)), |
| 10.0 | parts | glycerol ethoxylate with a molecular weight of 300 g/mol (Polyglykol G 300, Clariant, component (F)), |
| 0.3 | parts | defoamer (D-Foam-R C 740, Clariant, component (F)), |
| 0.2 | parts | preservative (Nipacide ® BSM, Clariant, component (F)), |
| 13.2 | parts | water (component (G)) |

For the production and testing of the pigment preparation, the procedure is as set out in example 1. After storage for one week at 60° C., the pigment preparation is liquid, homogeneous, and foam-free. The viscosity of the pigment preparation is 652 mPa·s. The rubout test shows no change in shade.

Example 12

| | | |
|---|---|---|
| 60.0 | parts | C.I. Pigment Blue 28 (Heucodur ® Blue 551, Heubach, component (A)), |
| 8.3 | parts | 30% aqueous solution of a sodium cocoylglycinate (Hostapon ® SG, Clariant, component (B)), |
| 8.0 | parts | tall oil fatty acid ethanolamide reacted with 15 mol of ethylene oxide (component (C)), |
| 10.0 | parts | glycerol ethoxylate with a molecular weight of 300 g/mol (Polyglykol G 300, Clariant, component (F)), |
| 0.3 | parts | defoamer (D-Foam-R C 740, Clariant, component (F)), |
| 0.2 | parts | preservative (Nipacide ® BSM, Clariant, component (F)), |
| 13.2 | parts | water (component (G)) |

For the production and testing of the pigment preparation, the procedure is as set out in example 1. After storage for one week at 60° C., the pigment preparation is liquid, homogeneous, and foam-free. The viscosity of the pigment preparation is 500 mPa·s. The rubout test shows no change in shade.

Example 13

| | |
|---|---|
| 60.0 parts | C.I. Pigment White 7 (Kronos ® Titanium Dioxide 2160, Kronos, component (A)), |
| 8.3 parts | 30% aqueous solution of a sodium cocoylglycinate (Hostapon ® SG, Clariant, component (B)), |
| 8.0 parts | tall oil fatty acid ethanolamide reacted with 15 mol of ethylene oxide (component (C)), |
| 10.0 parts | glycerol ethoxylate with a molecular weight of 300 g/mol (Polyglykol G 300, Clariant, component (F)), |
| 0.3 parts | defoamer (D-Foam-R C 740, Clariant, component (F)), |
| 0.2 parts | preservative (Nipacide ® BSM, Clariant, component (F)), |
| 13.2 parts | water (component (G)) |

For the production and testing of the pigment preparation, the procedure is as set out in example 1. After storage for one week at 60° C., the pigment preparation is liquid, homogeneous, and foam-free. The viscosity of the pigment preparation is 954 mPa·s. The rubout test shows no change in shade.

Example 14

| | |
|---|---|
| 50.0 parts | C.I. Pigment Yellow 184 (Sicopal ® Yellow L 1100, BASF, component (A)), |
| 8.3 parts | 30% aqueous solution of a sodium cocoylglycinate (Hostapon ® SG, Clariant, component (B)), |
| 8.0 parts | tall oil fatty acid ethanolamide reacted with 15 mol of ethylene oxide(component (C)), |
| 10.0 parts | glycerol ethoxylate with a molecular weight of 300 g/mol (Polyglykol G 300, Clariant, component (F)), |
| 0.3 parts | defoamer (D-Foam-R C 740, Clariant, component (F)), |
| 0.2 parts | preservative (Nipacide ® BSM, Clariant, component (F)), |
| 23.2 parts | water (component (G)) |

For the production and testing of the pigment preparation, the procedure is as set out in example 1. After storage for one week at 60° C., the pigment preparation is liquid, homogeneous, and foam-free. The viscosity of the pigment preparation is 370 mPa·s. The rubout test shows no change in shade.

Example 15

| | |
|---|---|
| 60.0 parts | C.I. Pigment Yellow 184 (Sicopal ® Yellow L 1100, BASF, component (A)), |
| 8.3 parts | 8.3 parts 30% aqueous solution of a cocamidopropyl betaine (Genagen ® CAB 818, Clariant, component (B)), |
| 8.0 parts | tall oil fatty acid ethanolamide reacted with 15 mol of ethylene oxide (component (C)), |
| 10.0 parts | glycerol ethoxylate with a molecular weight of 300 g/mol (Polyglykol G 300, Clariant, component (F)), |
| 0.3 parts | defoamer (D-Foam-R C 740, Clariant, component (F)), |
| 0.2 parts | preservative (Nipacide ® BSM, Clariant, component (F)), |
| 13.2 parts | water (component (G)) |

For the production and testing of the pigment preparation, the procedure is as set out in example 1. After storage for one week at 60° C., the pigment preparation is liquid, homogeneous, and foam-free. The viscosity of the pigment preparation is 1580 mPa·s. The rubout test shows no change in shade.

Example 16

| | |
|---|---|
| 60.0 parts | C.I. Pigment Black 11 (Bayferrox ® Black 316, Lanxess, component (A)), |
| 8.3 parts | 30% aqueous, pasty dispersion of a coconut fatty acid methyltauride, sodium salt (Hostapon ® CT Paste, Clariant, component (B)), |
| 8.0 parts | tall oil fatty acid ethanolamide reacted with 15 mol of ethylene oxide (component (C)), |
| 10.0 parts | glycerol ethoxylate with a molecular weight of 300 g/mol (Polyglykol G 300, Clariant, component (F)), |
| 0.3 parts | defoamer (D-Foam-R C 740, Clariant, component (F)), |
| 0.2 parts | preservative (Nipacide ® BSM, Clariant, component (F)), |
| 13.2 parts | water (component (G)) |

For the production and testing of the pigment preparation, the procedure is as set out in example 1. After storage for one week at 60° C., the pigment preparation is liquid, homogeneous, and foam-free. The viscosity of the pigment preparation is 966 mPa·s. The rubout test shows no change in shade.

Example 17

Comparative Example

| | |
|---|---|
| 50.0 parts | C.I. Pigment Red 101 (Bayferrox ® Red 130, Lanxess, component (A)), |
| 8.0 parts | tall oil fatty acid ethanolamide reacted with 15 mol of ethylene oxide (component (C)), |
| 10.0 parts | glycerol ethoxylate with a molecular weight of 300 g/mol (Polyglykol G 300, Clariant, component (F)), |
| 0.3 parts | defoamer (D-Foam-R C 740, Clariant, component (F)), |
| 0.2 parts | preservative (Nipacide ® BSM, Clariant, component (F)), |
| 31.5 parts | water (component (G)) |

For the production and testing of the pigment preparation, the procedure is as set out in example 1. After the grinding operation, the pigment preparation is a highly viscous paste. After storage for one week at 60° C., the paste separates into two phases and forms a solid sediment. The paste is inhomogeneous and cannot be used for tinting a paint.

Example 18

Comparative Example

| | |
|---|---|
| 50.0 parts | C.I. Pigment Yellow 184 (Sicopal ® Yellow L 1100, BASF, component (A)), |
| 0.9 parts | coconut fatty amine (Genamin CC100, Clariant, component (B)), |
| 8.0 parts | tall oil fatty acid ethanolamide reacted with 15 mol of ethylene oxide (component (C)), |
| 10.0 parts | glycerol ethoxylate with a molecular weight of 300 g/mol (Polyglykol G 300, Clariant, component (F)), |

-continued

```
0.3 parts  defoamer (D-Foam-R C 740, Clariant, component (F)),
0.2 parts  preservative (Nipacide ® BSM, Clariant, component (F)),
30.6 parts water (component (G))
```

For the production and testing of the pigment preparation, the procedure is as set out in example 1. After storage for one week at 60° C., the pigment preparation has separated. A solid sediment has formed, which can be dispersed by vigorous stirring.

Example 19

Comparative Example

```
60.0 parts  C.I. Pigment Black 11 (Bayferrox ® Black 316,
            Lanxess, component (A)),
```

-continued

```
8.0 parts   oleyl ethoxylate with 10 mol of ethylene oxide (Genapol
            O100, Clariant, component (C)),
10.0 parts  glycerol ethoxylate with a molecular weight of 300 g/mol
            (Polyglykol G 300, Clariant, component (F)),
0.3 parts   defoamer (D-Foam-R C 740, Clariant, component (F)),
0.2 parts   preservative (Nipacide ® BSM, Clariant, component (F)),
21.5 parts  water (component (G))
```

For the production and testing of the pigment preparation, the procedure is as set out in example 1. After the grinding operation, the pigment preparation is a highly viscous paste which is unsuitable for automatic metering devices, with a viscosity lying outside the measuring range of the viscometer.

The comparative examples above show the importance of the combination of components B and C according to the invention. Pigment preparations with a suitable viscosity can be produced with the combination of components B and C according to the invention, but not with B alone.

| Example | B | C | after storage | viscosity [mPas] | Rubout color change | Color strength [%] |
|---|---|---|---|---|---|---|
| 1 | Coconut fatty acid isothionate, Na salt | TOFA-EA + 10 EO | liquid, homogeneous, foamy | 246 | no | 100 |
| 2 (C) | — | TOFA-EA + 5 EO sodium 2-EA-sulfosuccinate | viscous, foamy | 1232 | yes | 87 |
| 3 (C) | — | TOFA-EA + 5 EO | viscous, foamy | 1360 | yes | 97 |
| 4 | Coconut fatty acid methylamide, Na salt | TOFA-EA + 15 EO | liquid, homogeneous, foamy | 264 | no | 108 |
| 5 | Na cocoylglycinate | TOFA-EA + 30 EO | liquid, homogeneous, foamy | 320 | no | 106 |
| 6 | ε-isononanoylcaproic acid trimethanolammonium salt | TOFA-EA + 15 EO | liquid, homogeneous, foamy | 203 | no | 99 |
| 7 | Sodium lauroylsanosol | TOFA-EA + 30 EO | liquid, homogeneous, foamy | 400 | no | 112 |
| 8 | Cocoamidopropyl betaine | TOFA-EA + 15 EO | liquid, homogeneous, foamy | 333 | no | 100 |
| 9 | Cocoamidopropylbetaine | TOFA-EA + 15 EO | liquid, homogeneous, foamy | 100 | no | n.d. |
| 10 | Na cocoylglycinate | TOFA-EA + 15 EO | liquid, homogeneous, foamy | 1206 | no | n.d. |
| 11 | Na cocoylglycinate | TOFA-EA + 15 EO | liquid, homogeneous, foamy | 652 | no | n.d. |
| 12 | Na cocoylglycinate | TOFA-EA + 15 EO | liquid, homogeneous, foamy | 500 | no | n.d. |
| 13 | Na cocoylglycinate | TOFA-EA + 15 EO | liquid, homogeneous, foamy | 954 | no | n.d. |
| 14 | Na cocoylglycinate | TOFA-EA + 15 EO | liquid, homogeneous, foamy | 370 | no | n.d. |
| 15 | Cocoamidopropyl betaine | TOFA-EA + 15 EO | liquid, homogeneous, foamy | 1580 | no | n.d. |
| 16 | Coconut fatty acid methylamide, Na salt | TOFA-EA + 15 EO | liquid, homogeneous, foamy | 966 | no | n.d. |
| 17 (C) | — | TOFA-EA + 15 EO | 2 phases, salt sediment | n.d. | n.d. | n.d. |
| 18 (C) | — | TOFA-EA + 15 EO | salt sediment | n.d. | n.d. | n.d. |
| 19 (C) | — | Oleic acid + 10 EO | Paste | undeterminable | n.d. | n.d. |

TOFA = Tall oil fatty acid
EA = Ethanolamine
EO = Ethylene oxide
n.d. = not determined

The invention claimed is:

1. An aqueous pigment preparation comprising
   (A) 1.0 to 75.0 wt % of at least one organic or inorganic white or chromatic pigment, or a mixture of different organic and inorganic white or chromatic pigments, (B) 0.01 to 8.0 wt % of at least one fatty acid condensation product of the formula (I), $$\underset{R}{\overset{O}{\|}}{-}A{-}(\phantom{x})_x{-}B \quad (I)$$

in which

R is a linear or branched alkyl or alkenyl radical having 7 to 21 carbon atoms,

A is an oxygen atom, a —NH group, a —N(CH$_3$) group, or a group of the formula (II), $$\underset{H}{-N}{-}(\phantom{y})_y{-}\underset{CH_3}{\overset{H_3C}{N^+}}{-} \quad (II)$$

B is a carboxylic acid group of the formula —COOH, a sulfonic acid group of the formula —SO$_3$H, the sodium, potassium, ammonium or monoalkanolammonium or trialkanolammonium salts thereof, and the deprotonated form —COO$^-$ and —SO$_3^-$ thereof, and x and y independently of one another are an integer from 1 to 8, (C) 0.01 to 12.0 wt % of a fatty acid ethanolamide ethoxylate of the formula (XI), $$R^1{-}\underset{H}{\overset{O}{\|}}{-}N{-}(\phantom{})_{}{-}(O{-})_m H \quad (XI)$$

in which m is an integer from 3 to 50 and R$^1$ is C$_7$ to C$_{21}$ alkyl or alkenyl, and (G) water.

2. The aqueous pigment preparation as claimed in claim 1, wherein component (B) is a fatty acid isethionate of the formula (III), $$R{-}\underset{}{\overset{O}{\|}}{-}O{-}{-}SO_3M \quad (III)$$

wherein M is H, sodium, potassium, or ammonium and

R is a linear or branched alkyl or alkenyl radical having 7 to 21 carbon atoms.

3. The aqueous pigment preparation as claimed in claim 1, wherein component (B) is a fatty acid tauride or a sodium, potassium, or ammonium salt thereof.

4. The aqueous pigment preparation as claimed in claim 1, wherein component (B) is a fatty acid methyltauride of the formula (IV), $$R{-}\underset{CH_3}{\overset{O}{\|}}{-}N{-}{-}SO_3M \quad (IV)$$

wherein M is H, sodium, potassium, or ammonium and

R is a linear or branched alkyl or alkenyl radical having 7 to 21 carbon atoms.

5. The aqueous pigment preparation as claimed in claim 1, wherein component (B) is a fatty acid glycinate of the formula (V), $$R{-}\underset{H}{\overset{O}{\|}}{-}N{-}{-}\underset{O}{\overset{}{C}}{-}OM \quad (V)$$

wherein M is H, sodium, potassium, or ammonium and

R is a linear or branched alkyl or alkenyl radical having 7 to 21 carbon atoms.

6. The aqueous pigment preparation as claimed in claim 1, wherein component (B) is a fatty acid amidocarboxylic acid or the salt thereof according to formula (VI), $$R{-}\underset{H}{\overset{O}{\|}}{-}N{-}(\phantom{x})_x{-}\underset{O}{\overset{}{C}}{-}OM \quad (VI)$$

wherein M is H, sodium, potassium, ammonium, monoalkanolammonium, or trialkanolammonium and R is a linear or branched alkyl or alkenyl radical having 7 to 21 carbon atoms.

7. The aqueous pigment preparation as claimed in claim 1, wherein component (B) is a sarcosine or sarcoside of the formula (VII), and is present either in acidic form as sarcosines or as neutralized sarcosides $$R{-}\underset{CH_3}{\overset{O}{\|}}{-}N{-}{-}\underset{O}{\overset{}{C}}{-}OM \quad (VII)$$

wherein M is H, sodium, potassium, or ammonium and

R is a linear or branched alkyl or alkenyl radical having 7 to 21 carbon atoms.

8. The aqueous pigment preparation as claimed in claim 1, wherein component (B) is a betaine of the formula (VIII),

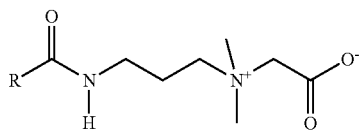

(VIII)

wherein R is a linear or branched alkyl or alkenyl radical having 7 to 21 carbon atoms.

9. The aqueous pigment preparation as claimed in claim 8, comprising 1 to 12 wt % of a fatty acid alkanolamide ethoxylate of the formula (XI)

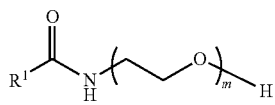

(XI)

wherein $R^1$ is $C_7$ to $C_{21}$ alkyl or alkenyl.

10. The aqueous pigment preparation as claimed in claim 1, comprising 1 to 8 wt % of a fatty acid condensation product of the formula (I).

11. The aqueous pigment preparation as claimed in claim 1, comprising 10 to 75 wt % of water.

12. The aqueous pigment preparation as claimed in claim 1, wherein R and $R^1$ independently of one another comprise 11 to 19 carbon atoms.

13. The aqueous pigment preparation as claimed in claim 1, which has a viscosity of 10 to 10 000 mPas, determined with a cone/plate viscometer at a shear rate of $1/60$ $sec^{-1}$.

14. The aqueous pigment preparation as claimed in claim 1, further, comprising (D) 0-8.0 wt % of clay mineral thickeners based on natural or alkali-activated montmorillonite phyllosilicate minerals.

15. The aqueous pigment preparation as claimed in claim 1, further comprising (E) 0-20.0 wt % of inorganic fillers.

16. The aqueous pigment preparation as claimed in claim 1, further comprising (F) 0 to 30 wt % of further auxiliaries customary for producing an aqueous pigment preparation and selected from the group consisting of wetting agents, humectants, solvents, defoamers, rheological additives, preservatives, buffer substances, and pH regulators.

17. The aqueous pigment preparation as claimed in claim 16, comprising up to 15 wt % of at least one humectant or solvent selected from the group consisting of glycol ethers having a 200 to 20 000 g/mol number-average molecular weight.

18. The aqueous pigment preparation as claimed in claim 16, comprising up to 2 wt % of defoamers.

19. The aqueous pigment preparation as claimed in claim 16, comprising up to 1 wt % of an in-can preservative.

20. A coating material, varnish, or comprising at least one aqueous pigment preparation as claimed in claim 1.

21. A process for printing two-dimensional sheet structures comprising the steps of adding at least one aqueous pigment preparation to a printing ink and applying the ink to the two-dimensional sheet structure.

\* \* \* \* \*